(12) United States Patent
Vanthomme

(10) Patent No.: US 10,149,438 B2
(45) Date of Patent: Dec. 11, 2018

(54) SHEETING FOR COVERED AN OBJECT

(71) Applicant: RKW HYPLAST N.V, Hoogstraten (BE)

(72) Inventor: Dominiek Vanthomme, Brecht (BE)

(73) Assignee: RKW HYPLAST N.V, Hoogstraten (BE)

( * ) Notice: Subject to any disclaimer, the term of this patent is extended or adjusted under 35 U.S.C. 154(b) by 229 days.

(21) Appl. No.: 15/504,502

(22) PCT Filed: Nov. 27, 2014

(86) PCT No.: PCT/EP2014/075807
§ 371 (c)(1),
(2) Date: Feb. 16, 2017

(87) PCT Pub. No.: WO2015/090893
PCT Pub. Date: Jun. 25, 2015

(65) Prior Publication Data
US 2017/0231161 A1    Aug. 17, 2017

(30) Foreign Application Priority Data

Dec. 19, 2013 (NL) ...................................... 2011990

(51) Int. Cl.
*B32B 3/04*  (2006.01)
*A01F 25/13*  (2006.01)
*A01F 15/07*  (2006.01)

(52) U.S. Cl.
CPC ................ *A01F 25/13* (2013.01); *B32B 3/04* (2013.01); *A01F 2015/0745* (2013.01);
(Continued)

(58) Field of Classification Search
CPC ..... Y10T 428/24215; Y10T 428/24223; Y10T 428/24231; Y10T 428/24264; B32B 3/04; A01F 25/13; A01F 2015/0745
See application file for complete search history.

(56) References Cited

U.S. PATENT DOCUMENTS 2,817,587 A  12/1957 Pleunis
4,483,127 A  11/1984 Forkner
(Continued)

FOREIGN PATENT DOCUMENTS

DE         964 486 C     5/1957
DE      34 07 022 A1     9/1985
WO     2013014136 A1     1/2013

OTHER PUBLICATIONS

PCT International Search Report and Written Opinion dated Mar. 12, 2015 for PCT International Patent Application No. PCT/EP2014/075807, 12 pages.
(Continued)

*Primary Examiner* — Alexander S Thomas
(74) *Attorney, Agent, or Firm* — Amster, Rothstein & Ebenstein LLP

(57) ABSTRACT

Combination of plastic sheeting for covering an object, such as silage, with at least two layers of sheeting, comprising a first folded sheet and a second folded sheet, wherein the second sheet is folded into said first sheet and wherein said second sheet is at least partially enclosed by said first sheet and wherein the sheets have first and second lateral edges, wherein seen in a cross section, at least the first lateral edges of the two sheets extend in close proximity to each other in the folded combination of sheets.

13 Claims, 3 Drawing Sheets

Figure 1:
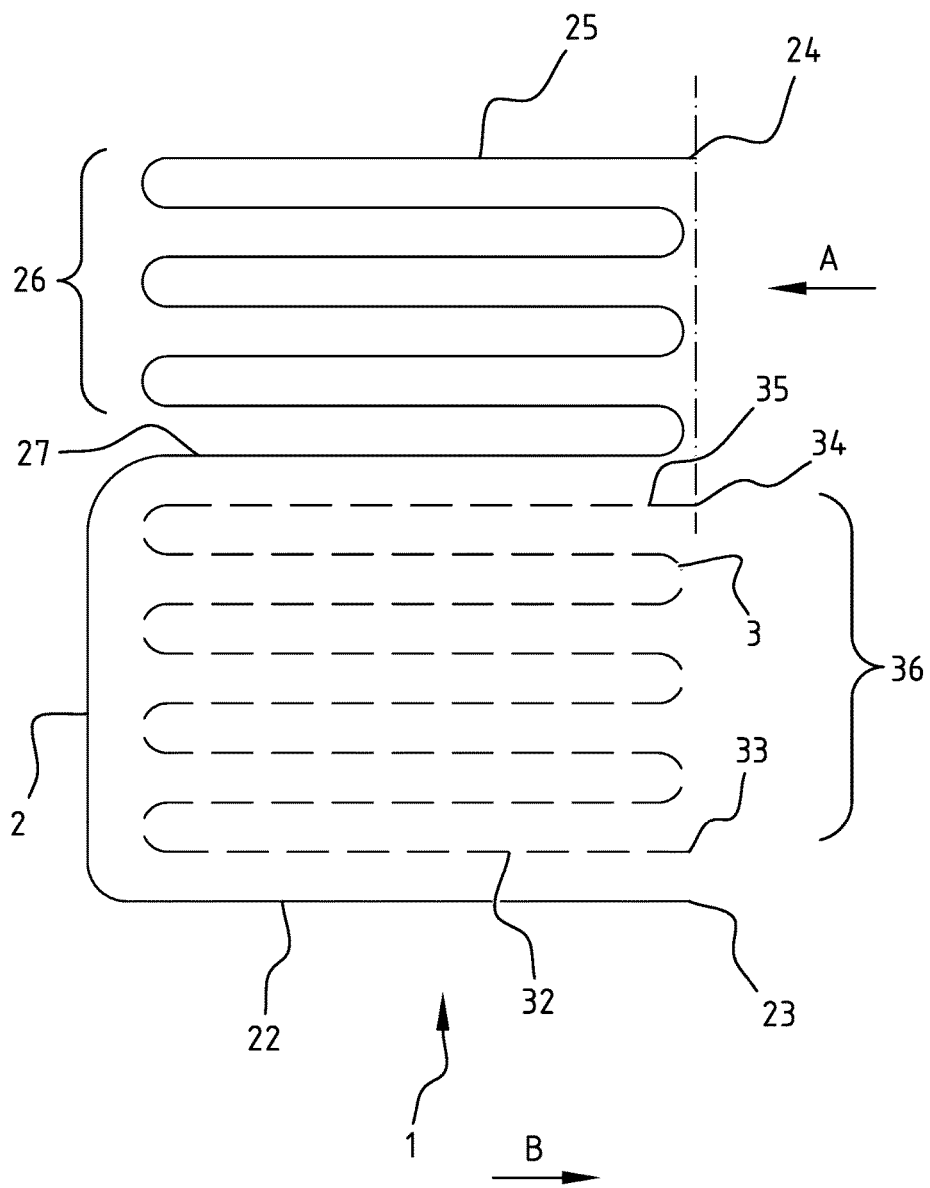

(52) U.S. Cl.
CPC ............ *Y10T 428/24215* (2015.01); *Y10T 428/24223* (2015.01); *Y10T 428/24231* (2015.01)

(56) References Cited

U.S. PATENT DOCUMENTS

| | | | |
|---|---|---|---|
| 5,046,619 A * | 9/1991 | Hwang | B65D 33/001 |
| | | | 206/233 |
| 8,342,360 B2 * | 1/2013 | Long | B65D 83/0894 |
| | | | 206/209 |
| 2002/0051863 A1 | 5/2002 | Chan | |
| 2012/0295070 A1 | 11/2012 | Eggers | |

OTHER PUBLICATIONS

PCT Notification Concerning Transmittal of International Preliminary Report on Patentability and Written Opinion of the International Searching Authority, dated Jun. 21, 2016 in connection with PCT International Patent Application No. PCT/EP2014/075807, 8 pages.

* cited by examiner

SHEETING FOR COVERED AN OBJECT

CROSS-REFERENCE TO RELATED APPLICATIONS

This application is a U.S. national stage entry under 35 U.S.C. § 371 of PCT International Patent Application No. PCT/EP2014/075807, filed Nov. 27, 2014, which claims priority to Netherlands Patent Application No. 2011990, filed Dec. 19, 2013, the contents of which are incorporated herein by reference in their entirety.

The present invention relates to combination of plastic sheeting for covering an object with at least two layers of sheeting, such as silage, comprising a first folded sheet and a second folded sheet.

For covering silage, plastic sheeting is used which is folded along folding lines extending in the lengthwise direction of the sheet to make the sheet more compact in the lateral direction. This folded sheet is then rolled up in the lengthwise direction to further reduce the compactness of the sheet for ease handling and transport. To cover the silage, the roll is first unrolled and the sheet is then unfolded by grapping the lateral edges of said sheet and by pulling the edges in opposite directions.

It is important that the covered silage is enclosed as airtight as possible. It is thereto known to first cover the silage with a first plastic sheet having a small thickness and to subsequently arrange a second plastic sheet having a larger thickness on top of said first sheet.

It is however difficult to arrange a second sheet on top of the thin first sheet without damaging said first sheet as the user needs to step onto the already unfolded first sheet to unfold the second sheet on top of the first sheet. To solve this problem, combination of two stacked sheets are known. In these combinations, two sheets, each being folded along lengthwise folding lines for forming two corresponding folding configurations, are stacked and subsequently rolled up. Simultaneously unfolding these two sheets in this combination after unrolling however proves to be difficult, as it is difficult to grasp the lateral edges of both of the sheets for pulling the edges apart for unfolding the sheets.

It is therefore a goal, among other goals, of the present invention to provide an improved, efficient combination of sheets for covering an object which can be used for efficiently cover an object.

This goal, among other goals, is met by a combination of plastic sheeting according to appended claims 1. More specifically, this goal, among other goals, is met by a combination of plastic sheeting for covering an object with at least two layers of sheeting, such as silage, with at least two layers of sheeting, comprising a first folded sheet and a second folded sheet, wherein the second sheet is folded into said first sheet and wherein said second sheet is at least partially enclosed by said first sheet and wherein the sheets have first and second lateral edges, wherein seen in a cross section, at least the first lateral edges of the two sheets extend in close proximity to each other in the folded combination of sheets. By folding the second sheet in the first sheet and arranging two corresponding lateral edges of these sheets in close proximity in the combination of sheets, the user can easily grasp these two edges to simultaneously unfold the two sheets. By simultaneously unfolding the two sheets, the object is covered at the same time by the two sheets, such that a layered cover is efficiently obtained. The edges of the two sheets need not be in direct contact, although this is preferred for easy grasping of said edges, but need to be close enough and accessible, preferable directly accessible, for the user to grasp said edges in preferably a single grasp for unfolding of the sheets.

To further improve the handling of the sheets when unfolding, also the second lateral edges of the two sheets preferably extend in close proximity, or preferably in direct contact, to each other in the folded combination.

The distance between the first and second lateral edges in the sheets define the width of the layered cover in unfolded state. The distances between edges in the two sheets, are therewith the width of the two sheets, is preferably substantially equal. More preferably, the two sheets have substantially the same size in unfolded state.

According to a preferred embodiment, the sheets in the combination according to the invention are two distinct sheets. Although the sheets may be connected at some locations, for instance near the edges to facilitate simultaneously grasping the edges, the two sheets are not bonded over their entire surface such as for instance in a multilayer sheet. The combination is in particular suitable for covering silage if the first sheet is thinner than the second sheet as described above. The first sheet is the lower sheet when unfolding the two sheets. The sheets are manufactured from a plastic material, for instance polyethylene, polypropylene or similar materials. The two sheets are preferably manufactured from the same material.

The invention is however not limited to a combination of sheeting for covering only silage. The combination may also be used to cover other objects with a double layer of plastic sheeting. The combination may for instance be used to cover frameworks of porches or greenhouses to form plastic wall and/or roof parts thereof. In particular for this use, the sheets preferably have the same thickness. It is further envisaged that other materials than plastic can be used for at least one of the sheets. Possible other materials for instance include paper and metal.

The invention is further not limited to a combination of only two sheets. It is also possible that the combination comprises a plurality of sheets, wherein the sheets are folded into each other to allow easy simultaneously unfolding of the plurality, for instance three, four or five, sheets. It is hereby preferred if the second sheet at least partially encloses a third sheet, which then optionally at least partially encloses a fourth sheet and so on.

It is noted that the configuration of the folding of the sheets, the folding configuration, is the configuration as seen in cross section in a plane perpendicular to the folding lines of the sheets. As said, the sheets are folded along folding lines which are parallel to the longitudinal direction and the lateral edges of sheet. Seen in this cross section, the second sheet is at least partially enclosed by said first sheet such that the lateral edges of these two sheets are in close proximity to each other as mentioned above. To further facilitate simultaneously unfolding of the sheets, it is preferred if said second sheet is substantially enclosed by said first sheet.

According to a further preferred embodiment, each of the folded sheets in the combination comprises at least one folded structure between the lateral edges, wherein a folded structure comprises a plurality of, seen in the cross section, zigzagging layers of sections of sheeting, wherein the folded structures of the two sheets are stacked. These folding structures reduce the lateral dimensions of the sheets in the folded combination. A combination of sheets with stacked folded structures is easy to manufacture and allows efficient unfolding, as the two folding structures can be unfolded with minimal mutual interference. The number of sections, or layers, in such a folded structure varies in dependence of the desired width of the sheets in unfolded state. A folded sheet, including the folded structure, may for instance have four, six or eight layers.

For easily unfolding the two sheets for covering the object with said two sheets, it is preferred if the first and second sheet have the same folding configuration seen in the cross section. With a folding configuration, as already mentioned above, the way of folding along the folding lines which are parallel to the longitudinal direction of the sheets is meant. Upon unfolding by pulling on at least one of the pairs of edges of the two sheets, the two sheets unfold substantially simultaneously as the two sheets are folded in the same way.

A further preferred embodiment of the combination according to the invention, seen in the cross section, comprises a underside formed by a section of the first sheet, wherein a section of the second sheet forming the underside of the second sheet is in contact with said section of the first sheet. The second sheet is hereby contained in the first sheet at the bottom thereof. One section of the first sheet and one section of the second sheet preferably form the two bottom sections of the combination. These section preferably stay at the same location during unfolding and form a part of the layered cover. It is then preferred if the sections of the first sheet and second sheets are corresponding sections in the folding configuration of said sheets. For instance, the section forming a lower side in the folding configuration of the first sheet is then in contact with the section forming the lower side in the folding configuration of the second sheet. This ensures that the way of unfolding of the two sheets is substantially the same, such that the corresponding sections stay in contact.

Different folding configurations can be used in the combination according to the invention. It is for instance possible that the sheets have a substantially U-shaped folding configuration, wherein the legs of said U-form are formed by two folded structures of said sheets. This configuration is also referred to as a C-fold, the C corresponding to the shape of a U. The edges of the sheet preferably extend in a central region of the folding configuration, seen in the cross section.

As already mentioned, it is preferred if the sections of the sheets forming the bottoms of these folded sheets are in contact in the folded combination. It is therefore preferred if the sections of the sheets forming the base of the U-shape of the sheets are in contact.

As an alternative, the sheets have a single folded structure, wherein the folding structure of the second sheets is folded into the folding structure of the first sheet. The lower sections of the two sheets are preferably again in direct contact. The sections of the sheets comprising one of the lateral edges are therefore preferably in contact.

The invention further relates to a roll of plastic sheeting comprising the combination of sheeting according to any of the preceding claims rolled along an axis which is perpendicular to the lateral edges.

Figure 2:
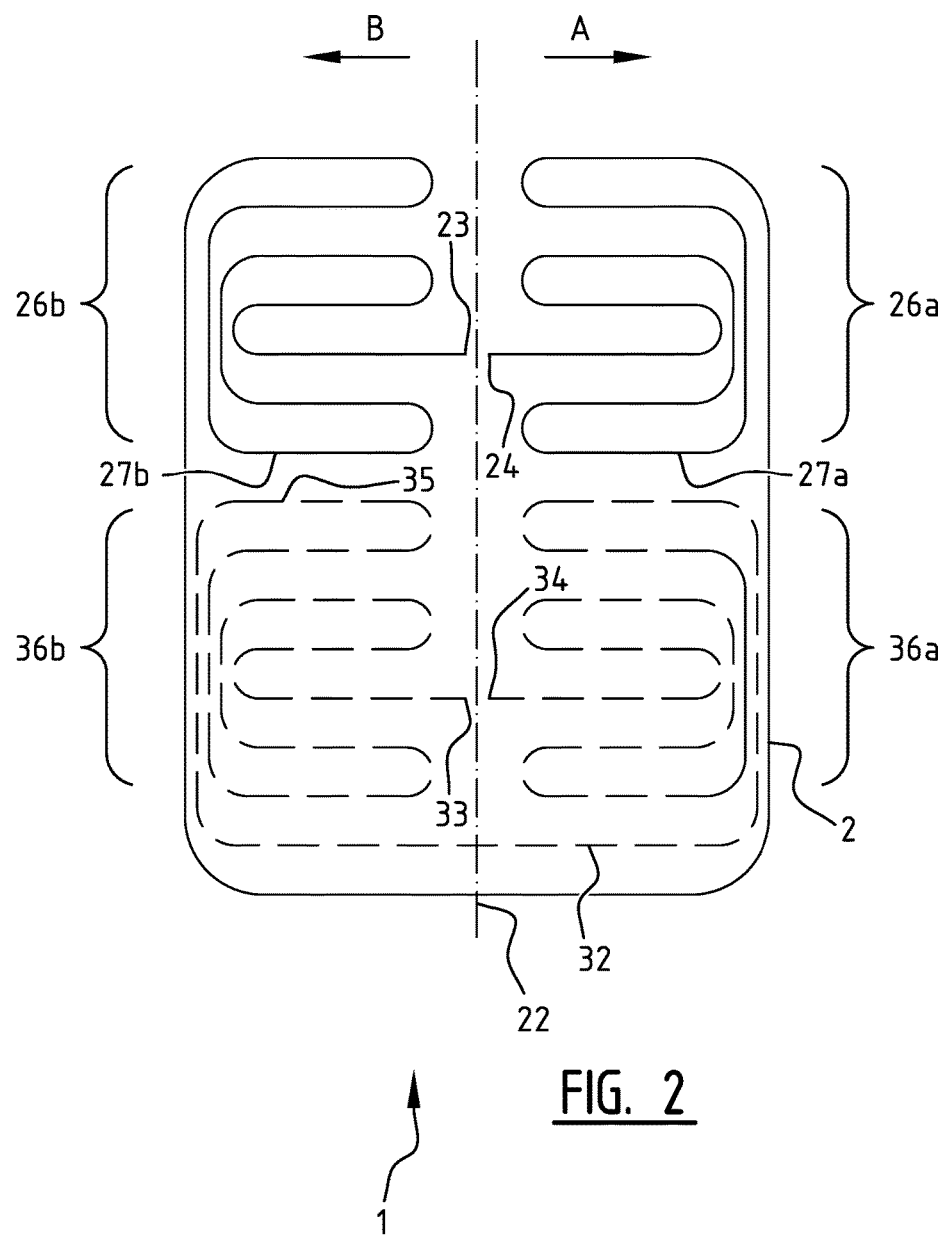
Figure 3:
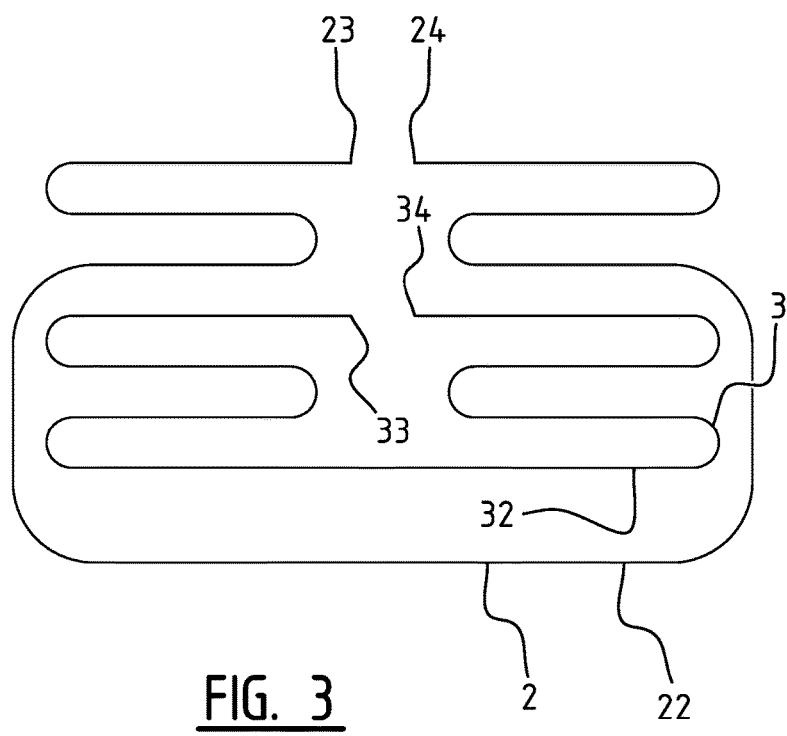

The present invention is further illustrated by the following Figures, which show preferred embodiments of the combination according to the invention, and are not intended to limit the scope of the invention in any way, wherein:

FIGS. 1-3 schematically show different embodiments of the combination according to the invention in cross section.

In FIG. 1, a combination 1 of two polyethylene sheets 2 and 3 is shown wherein a thicker upper sheet 3 is folded into a thinner lower sheet 2. The two sheets 2 and 3 are folded eight times, forming a zigzag structure generally indicated with 26 and 36. The zigzag structure 26 of the thinner sheet 2 is stacked onto the zigzag structure 36 of the thicker sheet 3, wherein a section 22 with an edge 23 of the thinner extends under a lower section 32 having an edge 33 of the thicker sheet 3. The upper section 35 of the sheet 3, having the other edge 34, contacts a lower sheet 27 of the zigzag structure 26. The first sheet 2 therefore encloses the second sheet 3. According to the invention, the edges 23 and 33 of the sheets 2 and 3 are in contact with each other, such that these edges can be grasped simultaneously for unfolding the sheets 2 and 3 together. Also the opposite edges 24 and 34 of the sheets 2 and 3 are in close proximity of each other, as indicated with the dashed line FIG. 1. It is to noted that in the figures, the folding configurations are depicted exploded manner. In practice, the sections of the sheets are in direct contact such that the height, and therefore the distance between edges 24 and 34 are smaller. Edges 24 and 34 can therefore easily be grasped. In this example, the edges 23, 33, 24 and 34 extend at the side of the folded combination as shown in FIG. 1. This allows easy grasping of the edges, compared to a folding configuration having a central cut, wherein the edges extend central in the folded combination. The combination 1 can be unfolded efficiently by simultaneously pulling the edges 24 and 34 in a direction indicated with A, while edges 23 and 33 remain stationary or are pulled in an opposite direction, indicated with B.

In the example of FIG. 2, two sheets 2 and 3 which are folded in the eight folded, slit C-fold (C8F-M) are shown. Each of the sheets 2 and 3 has two zigzag structures 26a, b and 36a, b, interconnected by lower sections 22 and 32. The folded sheet 3 is placed onto the bottom section 22 of the first sheet 2, such that the bottom sections 22 and 32 of the two sheets are in contact. The second sheet 3 is hereby enclosed by lower sections 27a,b of the zigzag structures 26a, b and the lower section 22 of the first sheet 2.

In this example, the edges 23, 24 and 33, 34 extend at a central location. However, as the folding configuration is substantially U-shaped, the respective corresponding edges of the two sheets, namely 23 and 33 on the one hand and edges 24 and 34 can be easily grasped and be pulled in opposite directions. The edges 23, 33, respectively, 24 and 34 hereby extend in close proximity to each other, as is indicated with the dashed line. Edges 23 and 33 are together pulled in the direction B, whereas edges 24 and 34 are together pulled in direction A. As the folding configurations of the two sheets 2 and 3 is the same, the sheets gradually unfold in substantially the same manner. The bottom sections 22 and 32 hereby stationary.

FIG. 3 shows an alternative folding configuration, which is referred to as the IMO or gusseted slit in the middle. Also in this embodiment, which is similar to the embodiment of FIG. 2, the second sheet 3 is enclosed by the first sheet 2, wherein the edges 23 and 33 on the one hand and the edges 24 and 34 extend close to each other in the combination. Again the bottom sections 22 and 32 of the folded sheets 2 and 3 are in contact.

The present invention is not limited to the embodiment shown, but extends also to other embodiments falling within the scope of the appended claims.

The invention claimed is:

1. Combination of plastic sheeting for covering an object with at least two layers of sheeting, comprising a first folded sheet and a second folded sheet, wherein the second sheet is folded into said first sheet and wherein said second sheet is enclosed by said first sheet and wherein the sheets have first and second lateral edges, wherein seen in a cross section, at least the first lateral edges of the two sheets extend in close proximity to each other in the folded combination of sheets, and wherein each of the folded sheets in the combination comprises at least one folded structure between the lateral edges, wherein a folded structure comprises a plurality of, seen in the cross section, zigzagging layers of sections of sheeting, wherein the folded structures of the two sheets are stacked.

2. Combination according to claim 1, wherein also the second lateral edges of the two sheets extend in close proximity to each other in the folded combination.

3. Combination according to claim 1, wherein the first and second sheet have the same folding configuration seen in the cross section.

4. Combination according to claim 3, wherein sections of the first sheet and second sheets are corresponding sections in the folding configuration of said sheets.

5. Combination according to claim 4, wherein sections of the sheets forming the base of the U-shape of the sheets are in contact.

6. Combination according to claim 4, wherein the sections of the sheets comprising one of the lateral edges are in contact.

7. Combination according to claim 1, wherein the combination, seen in the cross section, comprises a underside formed by a section of the first sheet, wherein a section of the second sheet forming the underside of the second sheet is in contact with said section of the first sheet.

8. Combination according to claim 1, wherein the sheets have a substantially U-shaped folding configuration, wherein the legs of said U-form are formed by two folded structures of said sheets.

9. Combination according to claim 1, wherein the sheets have a single folded structure, wherein the folding structure of the second sheets is folded into the folding structure of the first sheet.

10. Combination according to claim 1, wherein the first sheet is thinner than the second sheet.

11. Roll of plastic sheeting comprising the combination of sheeting according to claim 1 rolled along an axis which is perpendicular to the lateral edges.

12. Combination according to claim 1, wherein the object is silage.

13. Combination according to claim 1, wherein the lateral edges extending in close proximity are in contact.

* * * * *